US008878985B2

(12) United States Patent
Lin et al.

(10) Patent No.: US 8,878,985 B2
(45) Date of Patent: Nov. 4, 2014

(54) FLASH MODULE AND IMAGE-CAPTURING APPARATUS (75) Inventors: Wei-Pong Lin, Taipei (TW); Yi-Jie Liao, New Taipei (TW); Ting-Cheng Lin, New Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 588 days.

(21) Appl. No.: 13/182,366

(22) Filed: Jul. 13, 2011

(65) Prior Publication Data
US 2012/0182465 A1 Jul. 19, 2012

(30) Foreign Application Priority Data

Jan. 18, 2011 (TW) .............................. 100101740 A (51) Int. Cl.
*H04N 5/222* (2006.01)
*H04N 5/225* (2006.01)
*H04N 1/60* (2006.01)
*G03B 15/05* (2006.01)
*G03B 17/04* (2006.01)

(52) U.S. Cl.
CPC ........... *H04N 5/2256* (2013.01); *H04N 1/6086* (2013.01); *G03B 15/05* (2013.01); *G03B 17/04* (2013.01); *G03B 2215/0507* (2013.01)
USPC ........................................ 348/371

(58) Field of Classification Search
USPC ............................................... 348/371; 362/8
See application file for complete search history.

(56) References Cited

U.S. PATENT DOCUMENTS

2004/0184797 A1* 9/2004 Yamane ........................ 396/177

FOREIGN PATENT DOCUMENTS

| JP | 02-093528 A | 4/1990 |
| JP | 2003-295286 A | 10/2003 |
| JP | 2003307769 A | 10/2003 |
| JP | 20050090801 A | 9/2005 |
| JP | 2005-284091 A | 10/2005 |
| JP | 2009-134107 A | 6/2009 |
| KR | 20090013578 A | 2/2009 |

OTHER PUBLICATIONS

Korean Notice of Allowance dated Jul. 16, 2012 with English translation.

* cited by examiner

*Primary Examiner* — Roberto Velez
*Assistant Examiner* — Stephen Coleman
(74) *Attorney, Agent, or Firm* — Rabin & Berdo, P.C.

(57) ABSTRACT

Embodiments of this invention provide a flash module and an image-capturing apparatus having the flash module. The flash module includes a flash, a base, a solenoid, a linkage bar, a hook, a first elastic member, and a second elastic member. When necessary, the elements of the flash module perform a process to automatically move the flash to an open position.

18 Claims, 13 Drawing Sheets

United States Patent US 8,878,985 B2

FLASH MODULE AND IMAGE-CAPTURING APPARATUS

CROSS-REFERENCE TO RELATED APPLICATIONS

The entire contents of Taiwan Patent Application No. 100101740, filed on Jan. 18, 2011, from which this application claims priority, are incorporated herein by reference.

BACKGROUND OF THE INVENTION

1. Field of the Invention

The present invention relates generally to flash modules and, more particularly, to image-capturing apparatuses having the flash modules.

2. Description of Related Art

In photography, a flash is a device used for producing an artificial flashlight to illuminate a scene. The time to use the flash is, for example, when taking an exposure in a dark environment such as night or when there is a need for simulating a real light scene. In addition, the flash may be used for capturing quickly-moving objects or changing the quality of light.

Modern cameras often activate the flash automatically. The flash and the camera are synchronized by using a flash synchronization cable, a radio signal, or a light-triggered manner.

A built-in type of pop-up electronic flash includes a light emitter embedded in an accommodation position of a camera and, if necessary, the light emitter is risen from the accommodation position to an emission position. When the user presses the shutter button, the light emitter flashes synchronously.

To satisfy the current compact-size trend, a good built-in type of pop-up flash requires fewer elements to open and shut itself in a limited space.

SUMMARY OF THE INVENTION

An object of the present invention is to provide built-in type of pop-up flash module employing fewer elements to open and shut itself in a limited space. Another object of this invention is to provide an image-capturing apparatus using the compact flash module.

Accordingly, one embodiment of this invention provides a flash module that comprises a flash, a base, a solenoid, a linkage bar, a hook, a first elastic member, and a second elastic member. The flash comprises a notch and a first hinge, the flash being rotated from an open position to a close position by the first hinge. The base comprises an accommodation space for placing the flash at the close position. The solenoid comprises an armature with an aperture and attracts the armature in a first position if the flash is at the close position. The linkage bar comprises a nick configured to fit the armature, and an upper end of the linkage bar contacts a lower end of the flash if the flash is at the close position. The hook comprises a crook, a shaft, and a second hinge, wherein the crook is arranged at one end of the hook and is inserted into the notch if the flash is at the close position, the shaft is arranged at another end of the hook and passes through the aperture, and the second hinge is used for rotating the hook. The first elastic member is arranged between the base and the shaft, and the second elastic member is arranged between the base and the flash.

Accordingly, another embodiment of this invention provides a flash module that comprises a flash, a base, a driver, a linkage bar, and a hook. The flash is rotated by a first hinge. The base is used for placing and connecting to the flash via the first hinge. The driver is arranged on the base and comprising an armature with an aperture. The linkage bar is arranged above the driver and comprising a nick and a hook. The nick is configured to fit the armature. The hook comprises a first end for catching the retracted flash in the base, a second end for engaging with the base and the armature, and a second hinge for rotating the hook.

Accordingly, another embodiment of this invention provides an image-capturing apparatus that comprises an image sensor for detecting a brightness, a processor for issuing a flash order according to the brightness, and a foregoing flash module of this invention.

The built-in type flash modules of embodiments of this invention employ a few elements to open and close the flash. In addition, all elements of the flash module are vertically arranged with respect to the image-capturing apparatus; this is beneficial to reduce the thickness and therefore minimize the size of the image-capturing apparatus.

BRIEF DESCRIPTION OF THE DRAWINGS

FIG. 1A and FIG. 1B show a flash module according to a preferred embodiment of this invention, wherein FIG. 1A shows the flash module being closed, and FIG. 1B shows the flash module being opened.

FIG. 3C shows the opened flash module.

FIG. 4A and FIG. 4B show how the control rod drives the lever according to the preferred embodiment of this invention, in which FIG. 4A shows the flash in the close position, and FIG. 4B shows the flash in the open position.

FIG. 6A and FIG. 6B show a mechanism to control the rotating angle of the flash according to the preferred embodiment, in which FIG. 6A is a front view of the flash module and FIG. 6B is a cross-sectional view taken along line A-A' in FIG. 6A.

DETAILED DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations have not been described in detail in order not to unnecessarily obscure the present invention. While drawings are illustrated in detail, it is appreciated that the quantity of the disclosed components may be greater or less than that disclosed, except where expressly restricting the amount of the components.

Figure 1A:
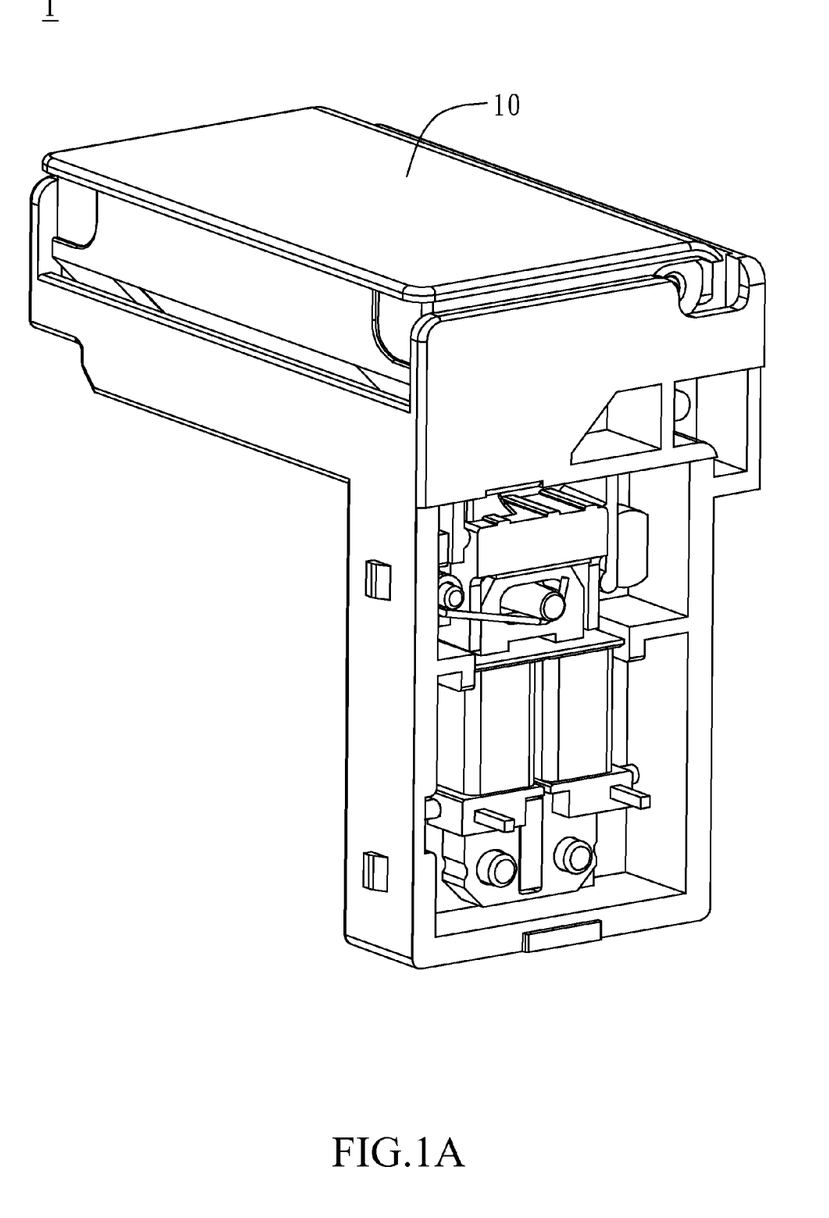
Figure 1B:
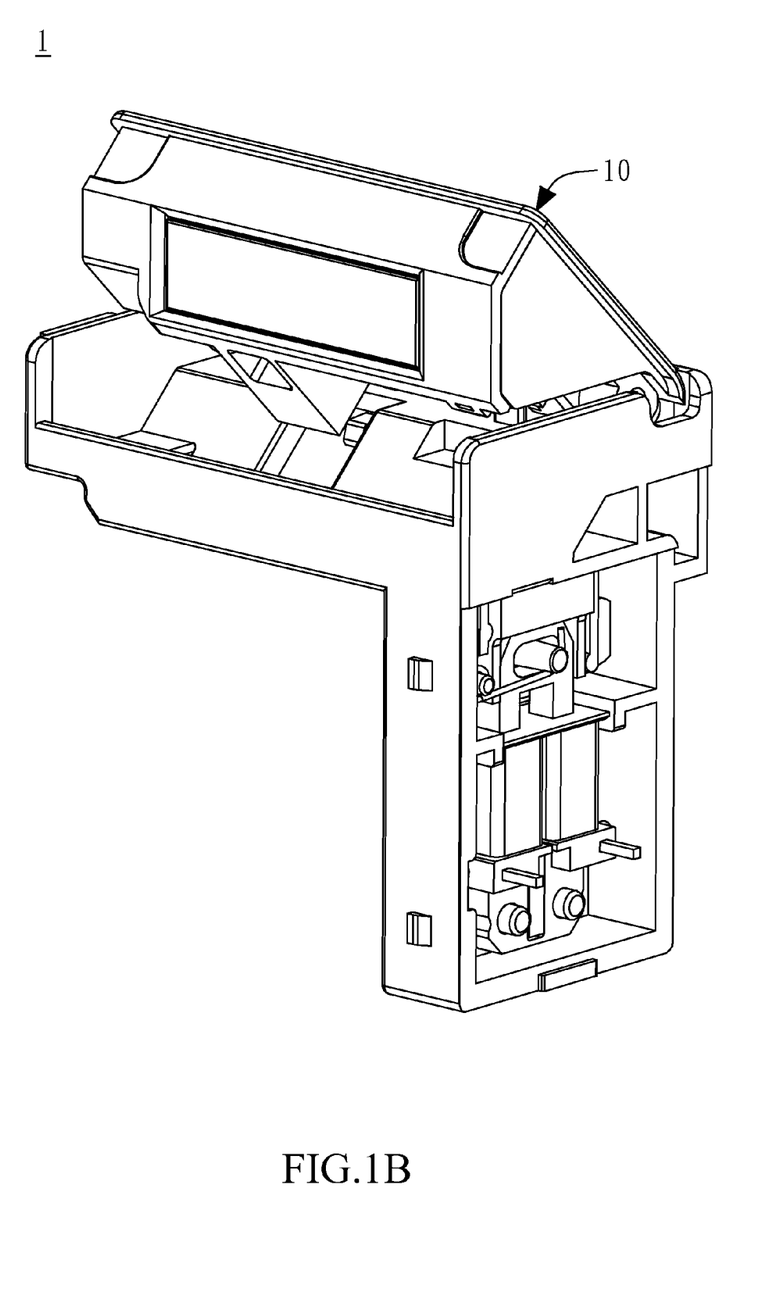

FIG. 1A and FIG. 1B show a flash module 1 according to a preferred embodiment of this invention, wherein FIG. 1A shows the flash module 1 being closed, and FIG. 1B shows the flash module 1 being opened. The flash module 1 of the embodiment may be applied in an image-capturing device, such as a camera or a video camera. The flash module 1 comprises a flash 10, which when necessary to illuminate a scene, it is pop-up from the close position to the open position, as respectively shown in FIG. 1A and FIG. 1B. When the user presses a shutter button, the flash flashes synchronously.

The above-mentioned flash module employs some linked elements to open and close the flash 10. The details are described as follows.

Figure 2:
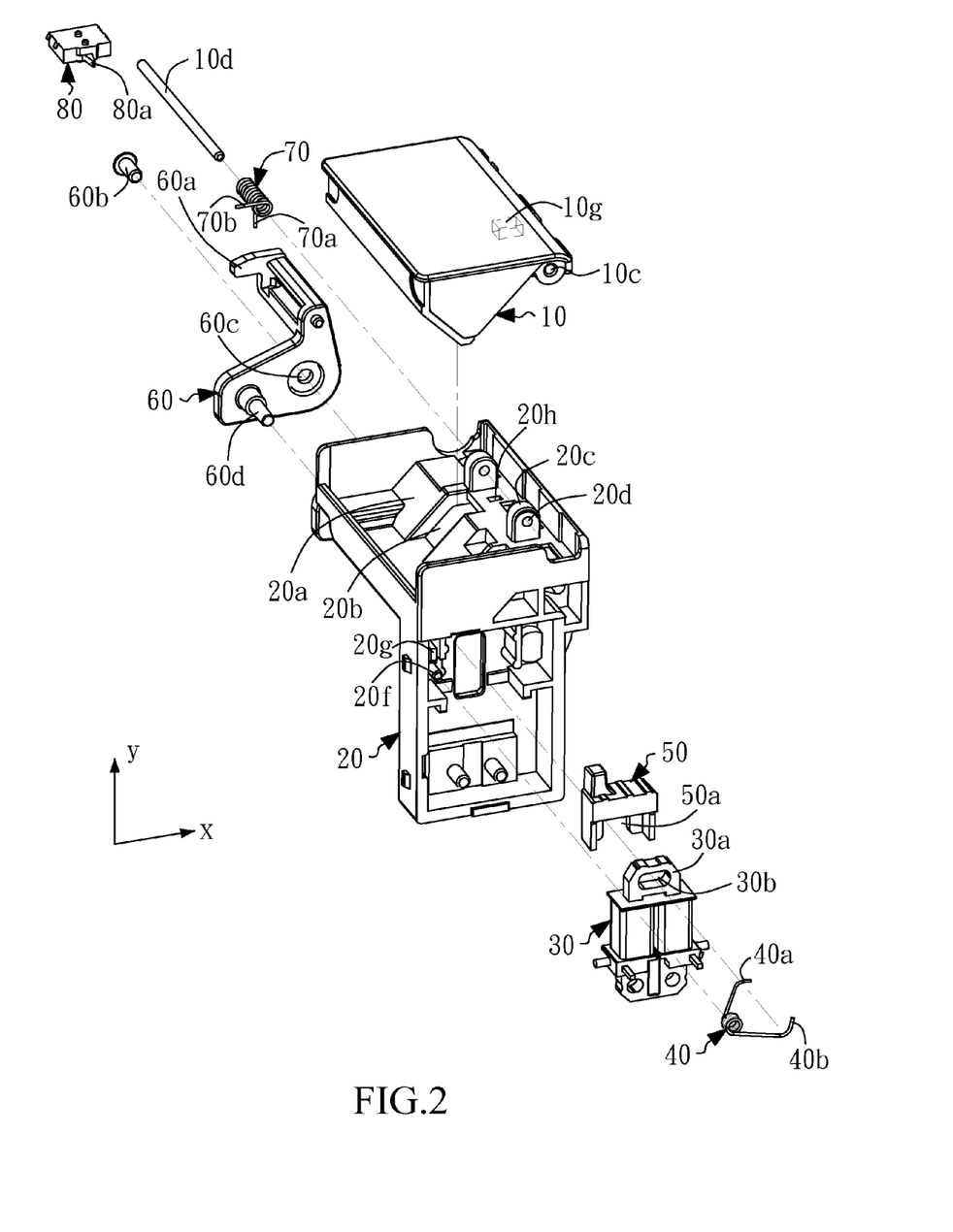
FIG. 2 is an explosion drawing showing the major elements of the flash module shown in FIG. 1.

The major elements of the flash module 1 are first introduced. FIG. 2 is an explosion drawing in which the flash module 1 primarily comprises a flash 10, a solenoid 30, a first spring 40, a linkage bar 50, a hook 60, a second spring 70, and a switch 80.

Figure 3A:
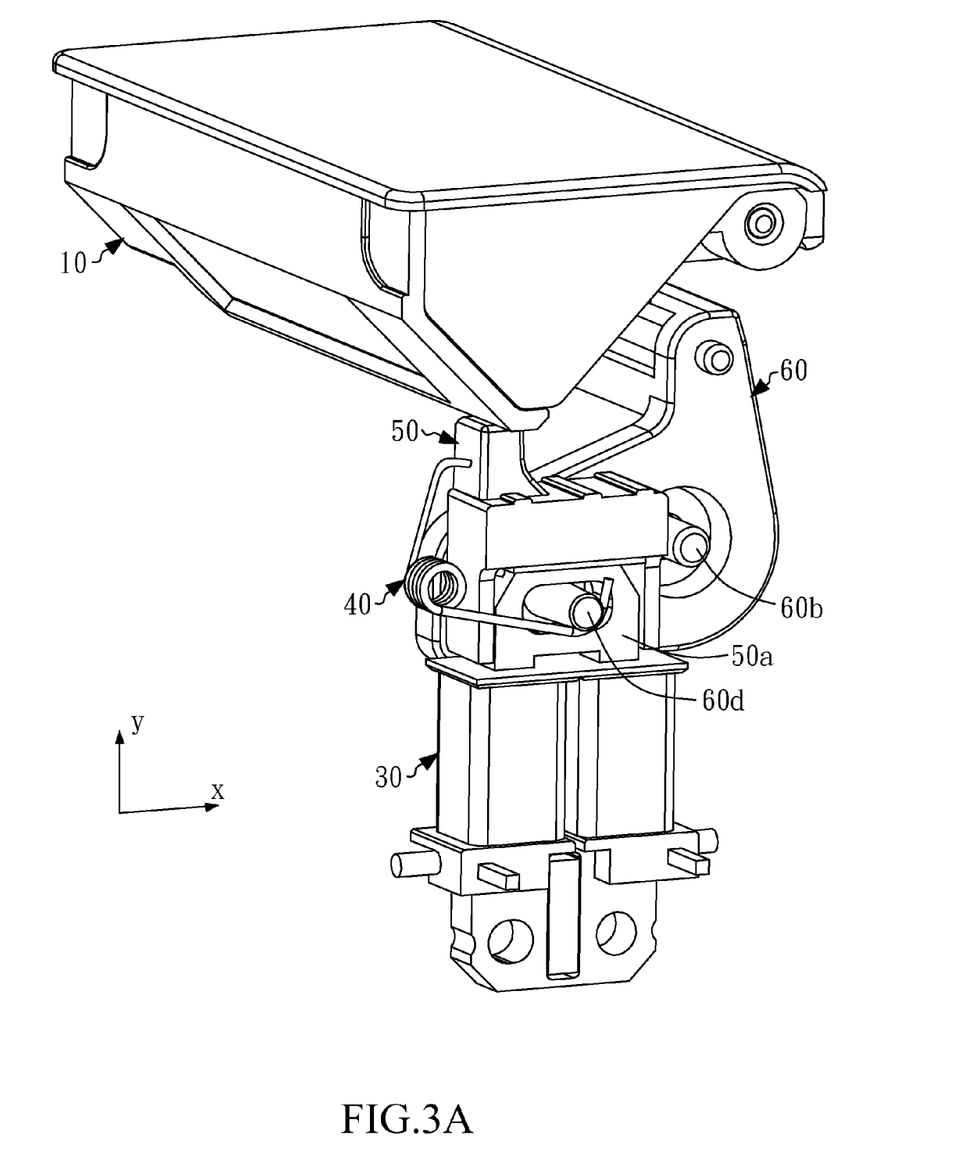
FIG. 3A, FIG. 3B, and FIG. 3C are perspective views of the major elements of the flash module according to the preferred embodiment of this invention, wherein FIG. 3A and FIG. 3B respectively show the closed flash module in two different view angles.
Figure 3B:
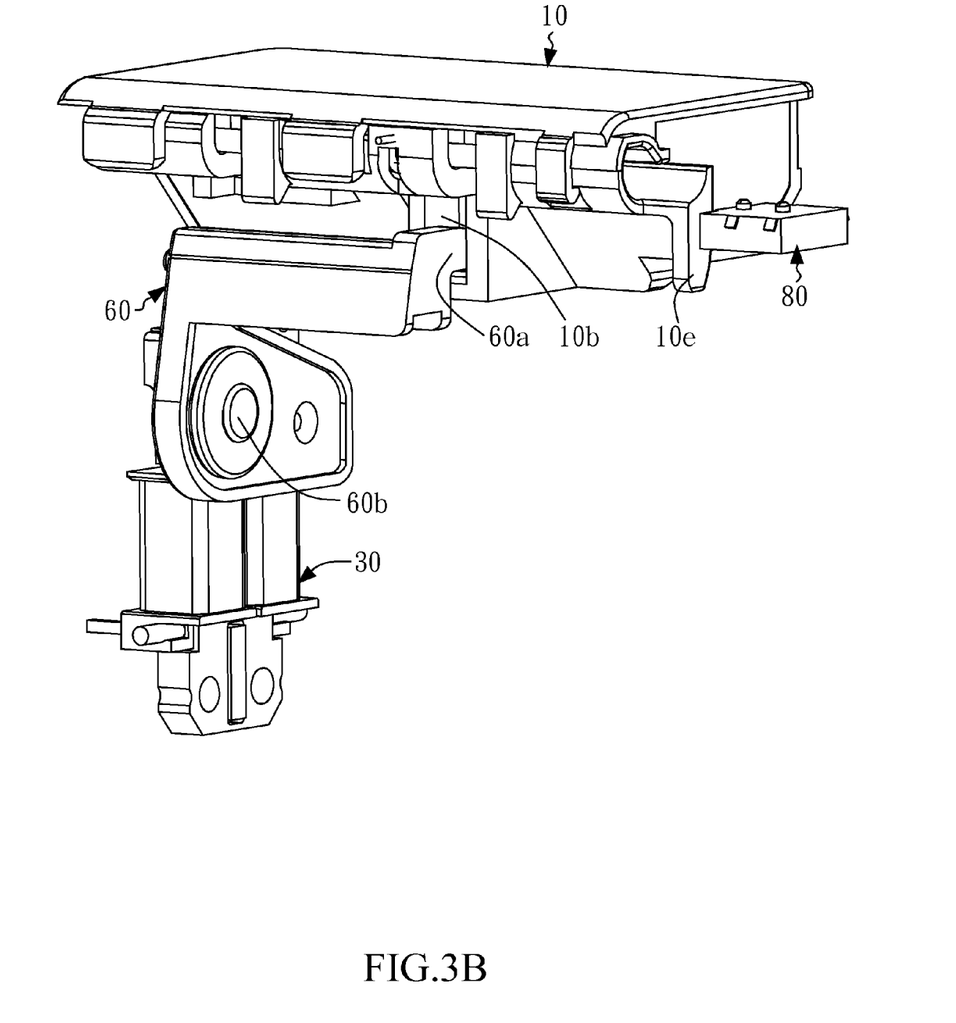
Figure 3C:
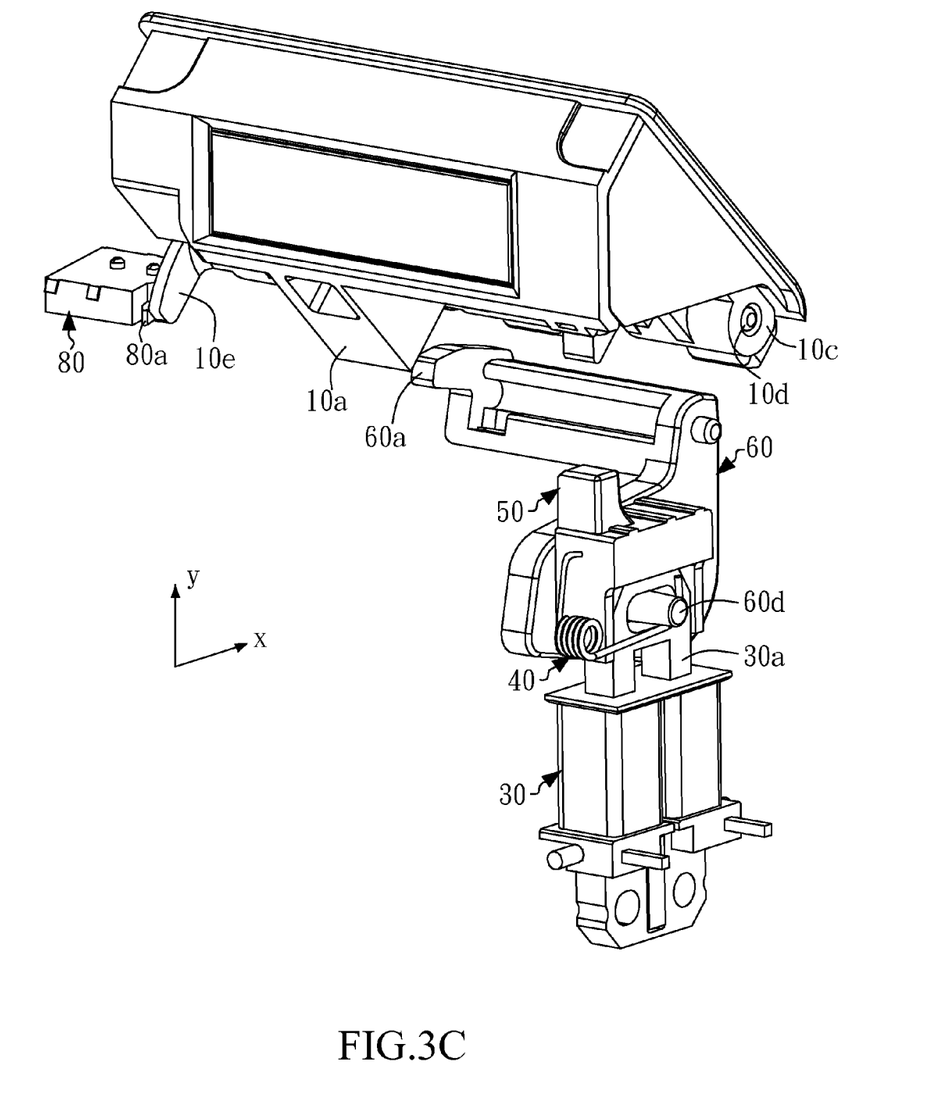

FIG. 3A, FIG. 3B, and FIG. 3C are perspective views of the major elements of the flash module 1, wherein FIG. 3A and FIG. 3B respectively show the closed flash module 1 in two different view angles, and FIG. 3C shows the opened flash module 1. In addition, these drawings omit the base 20 for clarity.

Referring to FIG. 2, FIG. 3A, FIG. 3B, and FIG. 3C, the flash 10 at least includes a block 10a, a notch 10b, two symmetrical holes 10c, and a first hinge 10d, in addition, the base 20 comprises an accommodation space 20a, an opening 20b, and two ribs 20c, wherein each rib 20c has a hole 20d. The first hinge 10d passes through the two holes 10c and the two holes 20d to link the flash and the base 20, and thus the flash 10 can be rotated using the first hinge 10d as the rotating center. In addition, the second spring 70, preferably a torsion-coiled spring 70, includes two ends 70a/70d in which one end 70a against a recess 20h of the base 20 and the other end 70b against a recess 10g of the flash. By doing so, the second spring 70 provides an elastic biasing force or torsion toward the y direction, which will drive the flash 10 rotating counterclockwise in the xy plane if not suppressed. In other embodiments, other elastic members or torsional members known in the art may replace the second spring 70.

Referring to FIG. 2 and FIGS. 3A-3B, the hook 60 comprises a crook 60a, a second hinge 60b, a hole 60c, and a shaft 60d. The second hinge 60b passes through the hole 60s so as to rotate the hook 60 in the xy plane. When the crook 60a engage with the notch 10b of the block 10a, the flash 10 is retracted in a close position; when the crook 60a disengages from the notch 10b, the flash 10 is projected to an open position. In the close position, the flash 10 is retracted in an accommodation space 20a of the base 20, and the block 10a is placed in the opening 20b of the base 20.

Referring to FIG. 2 again, the solenoid 30 comprises an armature 30a arranged above the solenoid 30 and capable of moving along the y direction. In addition, the armature 30a includes an aperture 30b. In this embodiment, the solenoid 30 comprises a permanent magnet (not shown) and a coil (not shown). When electricity is not supplied, the magnetic force of the permanent magnet attracts the armature 30a in a retracted position. When electricity is supplied, the coil generates another magnetic force to cancel out the magnetic force of the permanent magnet, such that the armature 30a is free. Referring to FIG. 3A and FIG. 3C, if a force is exerted to the armature 30a along y direction, it will move the armature 30a along y direction. To this end, the shaft 60d arranged at one end of the L-shaped hook 60 passes through the aperture 30b of the armature 30a. In addition, the center of the first spring 40 passes through a rib 20f of the base 20 and the first spring 40 includes two ends 40a/40b in which one end 40a clasps a trap constructed by the base 20 and a lump 20g, and the other end 40b clasps the shaft 60d that projects from the aperture 30b. By doing so, the first spring 40 provides the armature 30a an elastic biasing force or torsion toward the y direction. Therefore, if the magnetic force attracting the armature 30a is canceled out, the first spring 40 will drive the armature 30a moving toward the (positive) y direction via the shaft 60d. In other embodiments, other elastic members or torsional members known in the art may replace the second spring 70. In addition, other drivers, such as an electromagnetic member or a motor, which can perform the same functions as the solenoid 30, may replace the solenoid 30.

Referring to FIG. 2 again, the linkage bar 50 is disposed above the armature 30a and includes a nick 50a constructed to fit the armature 30a. When the armature 30a is moved along y direction, the armature 30a drives the linkage bar 50, via the nick 50a, moving along y direction as well. On the contrary, if a force is exerted to the linkage bar 50 in the negative y direction, the linkage bar 50 will drive the armature 30a, via the nick 50a, moving along negative y direction. Referring to FIG. 3A, in detail, when the flash 10 is in the close position, the upper end of the linkage bar 50 will touch the lower end of the flash 10.

Referring to FIG. 3B and FIG. 3C, the switch 80 is arranged a side of the flash 10 for detecting its position. In detail, the switch 80 includes a lever 80a, and the flash 10 further comprises a control rod 100e that rotates as the flash rotates; when the position of the flash 10 is changed, the control rod 10e will drive the lever 80a levering, such that the position change of the flash 10 is detected.

Figure 4A:
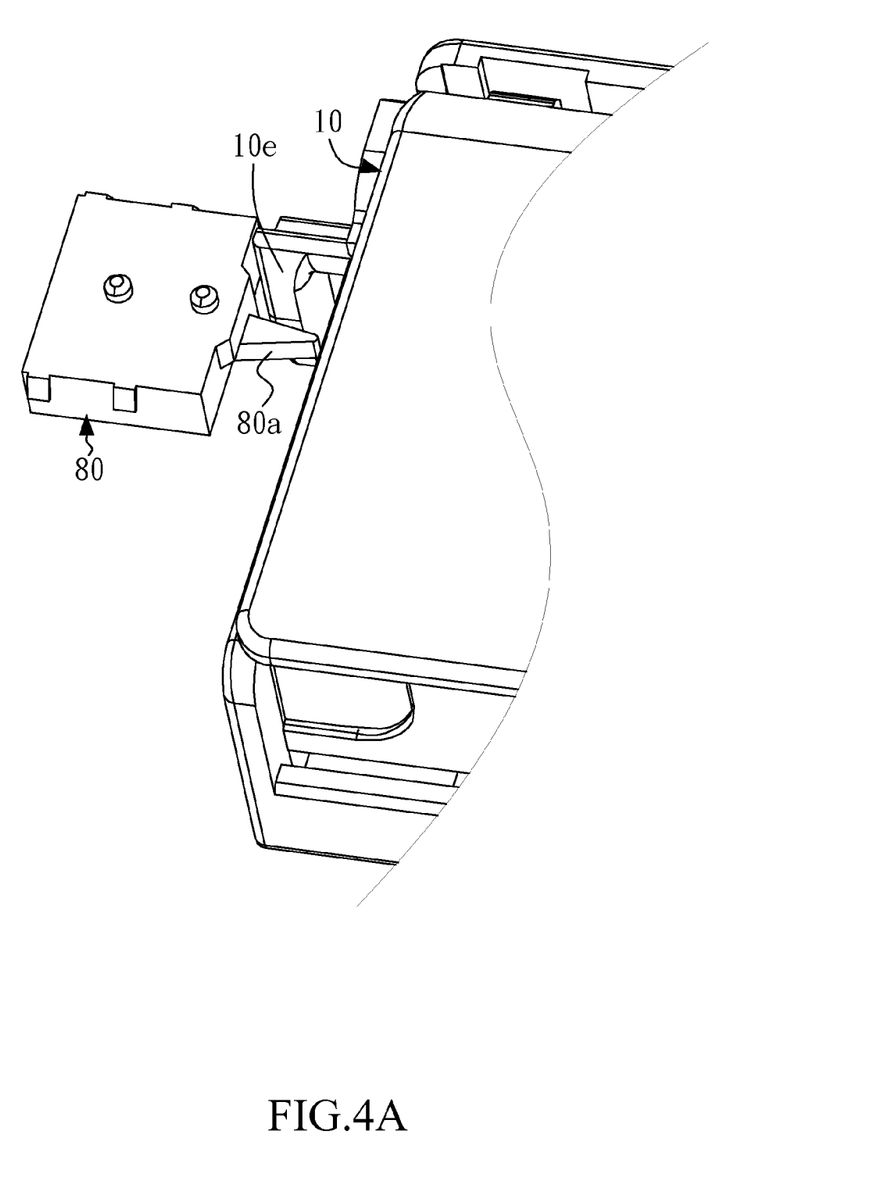
Figure 4B:
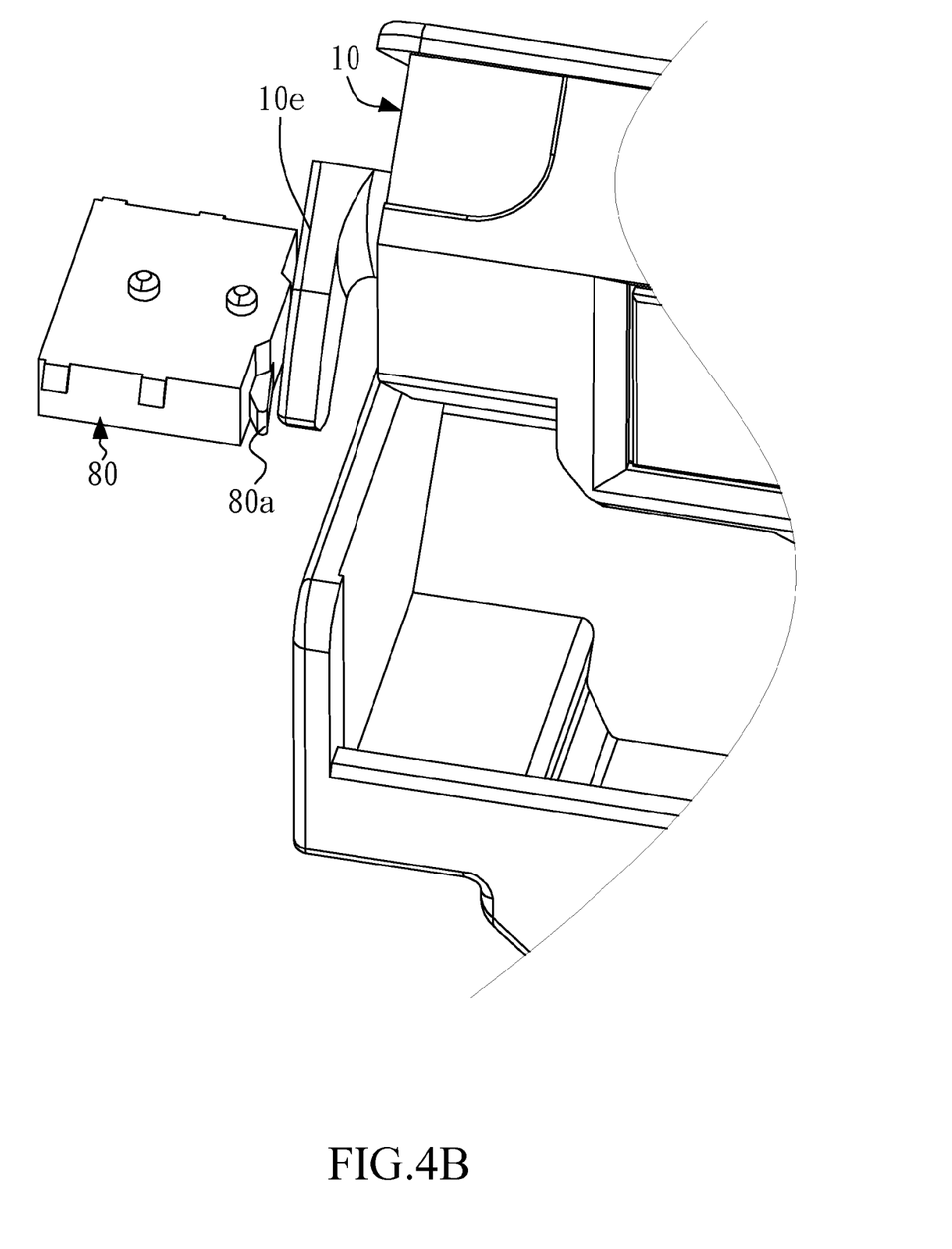

FIG. 4A and FIG. 4B show how the control rod 10e drives the lever 80a, in which FIG. 4A shows the flash 10 in the close position, and FIG. 4B shows the flash 10 in the open position. Notice that other embodiments of this invention may omit the control rod 10e and switch 80, and employ other components or methods to detect the position of the flash 10.

Figure 5A:
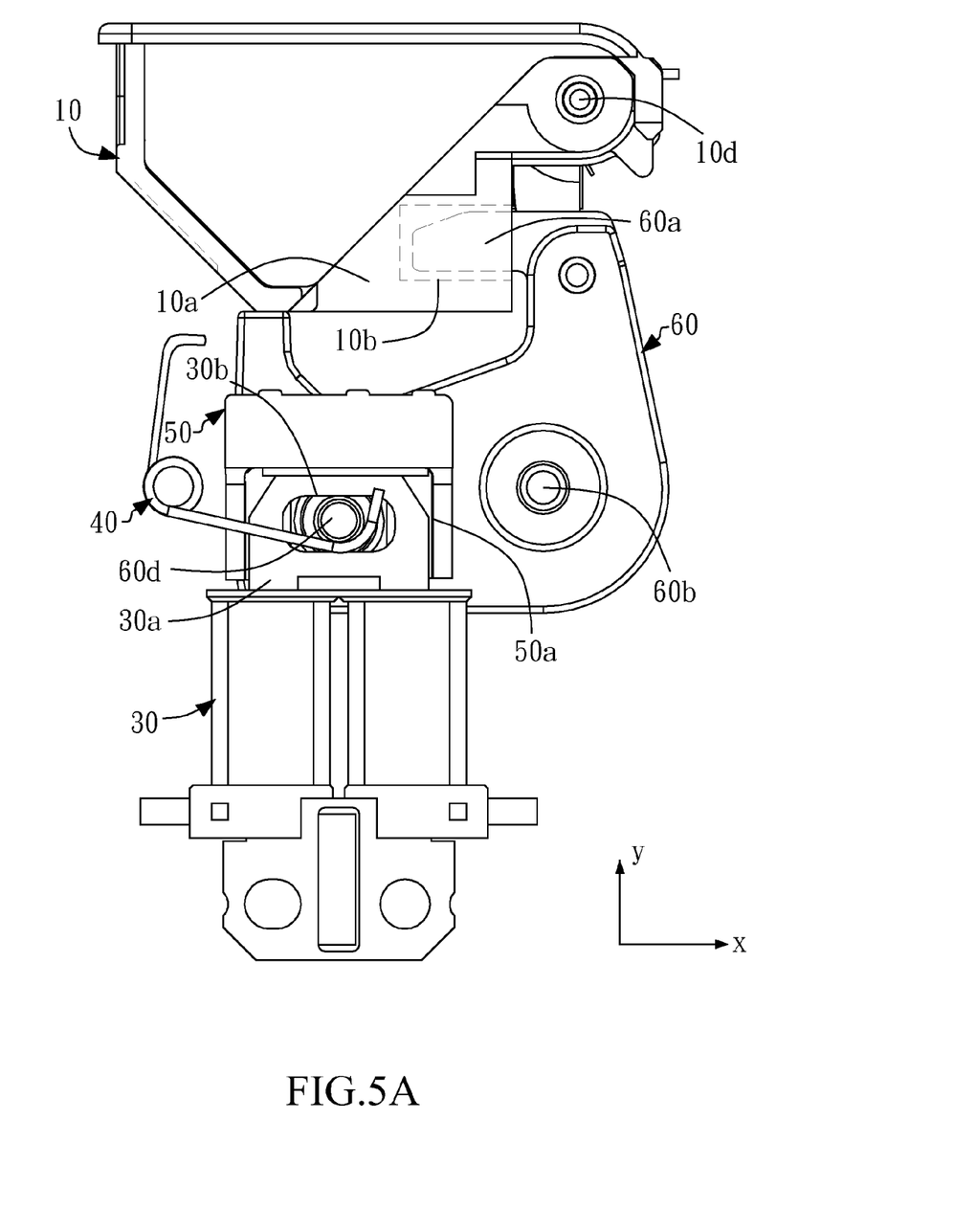
FIG. 5A and FIG. 5B are side views respectively showing the major components of the flash module in the close position and the open position, according to the preferred embodiment.
Figure 5B:
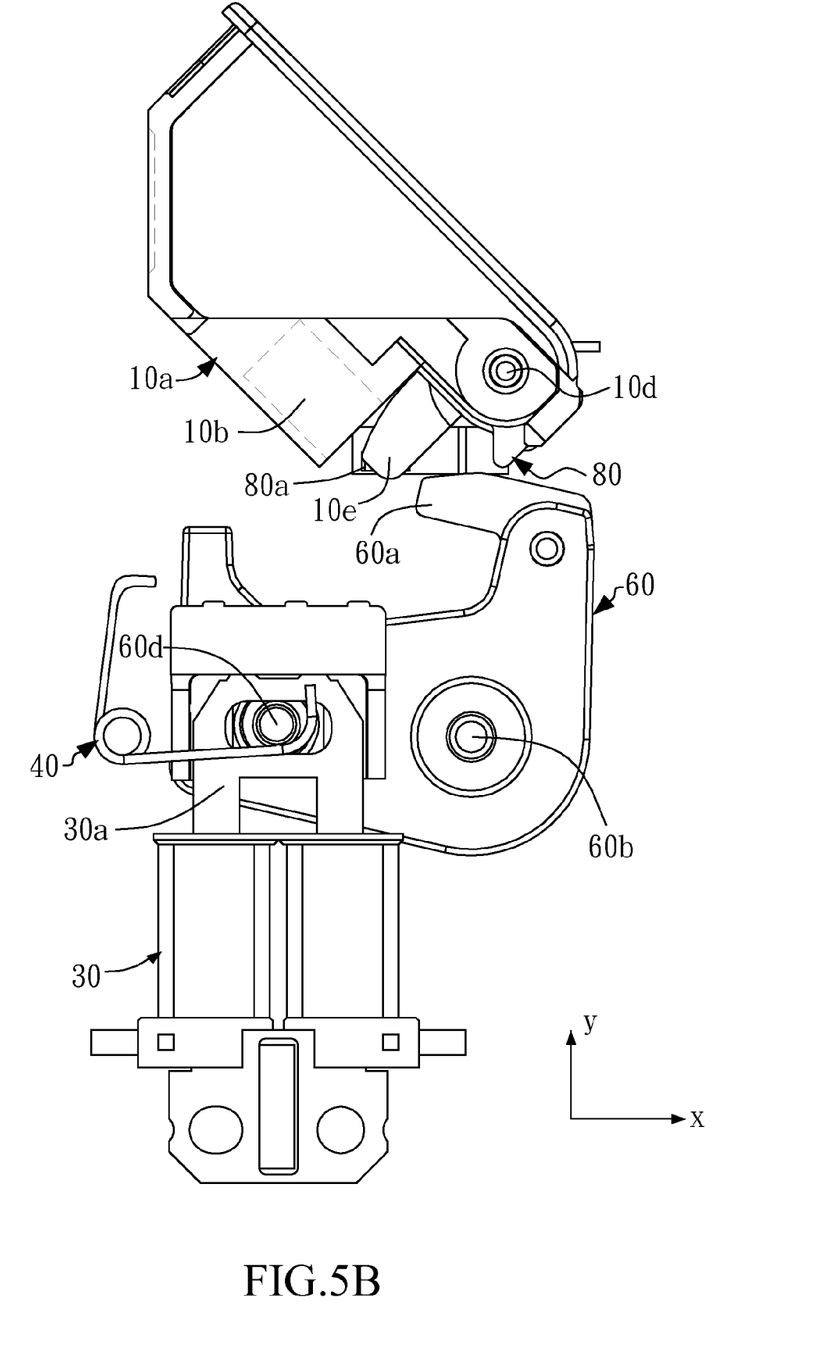

Then the procedures to open and close the flash module 1 are described as follows. FIG. 5A and FIG. 5B are side views respectively showing the major components of the flash module 1 in the close position and the open position, according to the preferred embodiment. The base 20 is not shown for clarity.

Referring to FIG. 2, FIG. 5A, and FIG. 5B, when the flash 10 is in the close position, electricity is not supplied to the solenoid 30 and the permanent magnet of the solenoid 30 exerts a magnetic force to attract the armature 30a. Because the magnetic force of the permanent magnet is greater than the elastic biasing force or torsion that is provided by the first spring 40 and drives the armature 30a moving toward the y direction, the armature 30a is retracted in the solenoid 30, as shown in FIG. 5A. When the flash 10 is determined to change its position from the close position to the open position, electricity is supplied to the solenoid 30 to cancel out the magnetic force exerted to the armature 30a, such that the first spring 40 drives the shaft 60d, the armature 30a, and the linkage bar 50 moving toward the y direction. The moving of the shaft 60d will make the hook 60 rotating clockwise in the xy plane by using the second hinge 60b as the rotating center, such that the crook 60a of the hook 60 is detached from the notch 10b and thus detached from the flash 10. In this time, the elastic biasing force of the second spring 70 is not suppressed, and which will drive the flash 10 rotating clockwise to an angle in the xy plane and using the first hinge 10d as the rotating center. The angle may be 45° for example, but not limited.

Moreover, referring to FIG. 5A, when the user wants to close the flash 10, he or she may use a hand to press the flash 10 by a downward force, which is opposite and greater than the elastic biasing force provided by the second spring 70, so as to make the lower end of the flash 10 in contact with linkage bar 50, which will drive the armature 30a, via the nick 50a, moving toward the negative y direction and back to the retracted position. The magnetic force of the permanent magnet of the solenoid 30 attracts the armature 30a again. In addition, the armature 30 drives the shaft 60d moving toward the negative y direction, and thus drives the hook 60 rotating counterclockwise in the xy plane by using the second hinge 60b as the rotating center, to insert the crook 60a of the hook 60 into the notch 10b and thus fix the flash 10 in the close position.

Figure 6A:
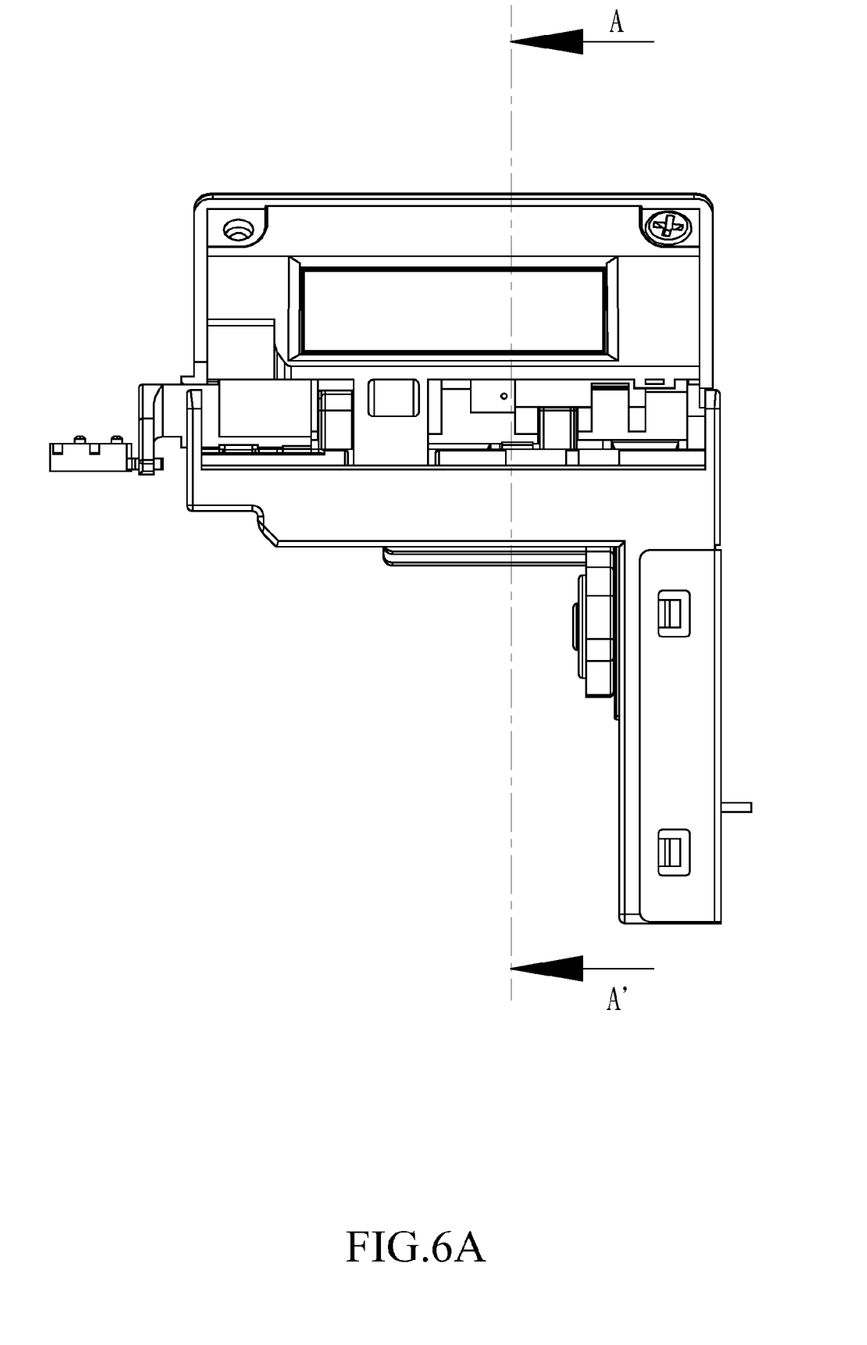
Figure 6B:
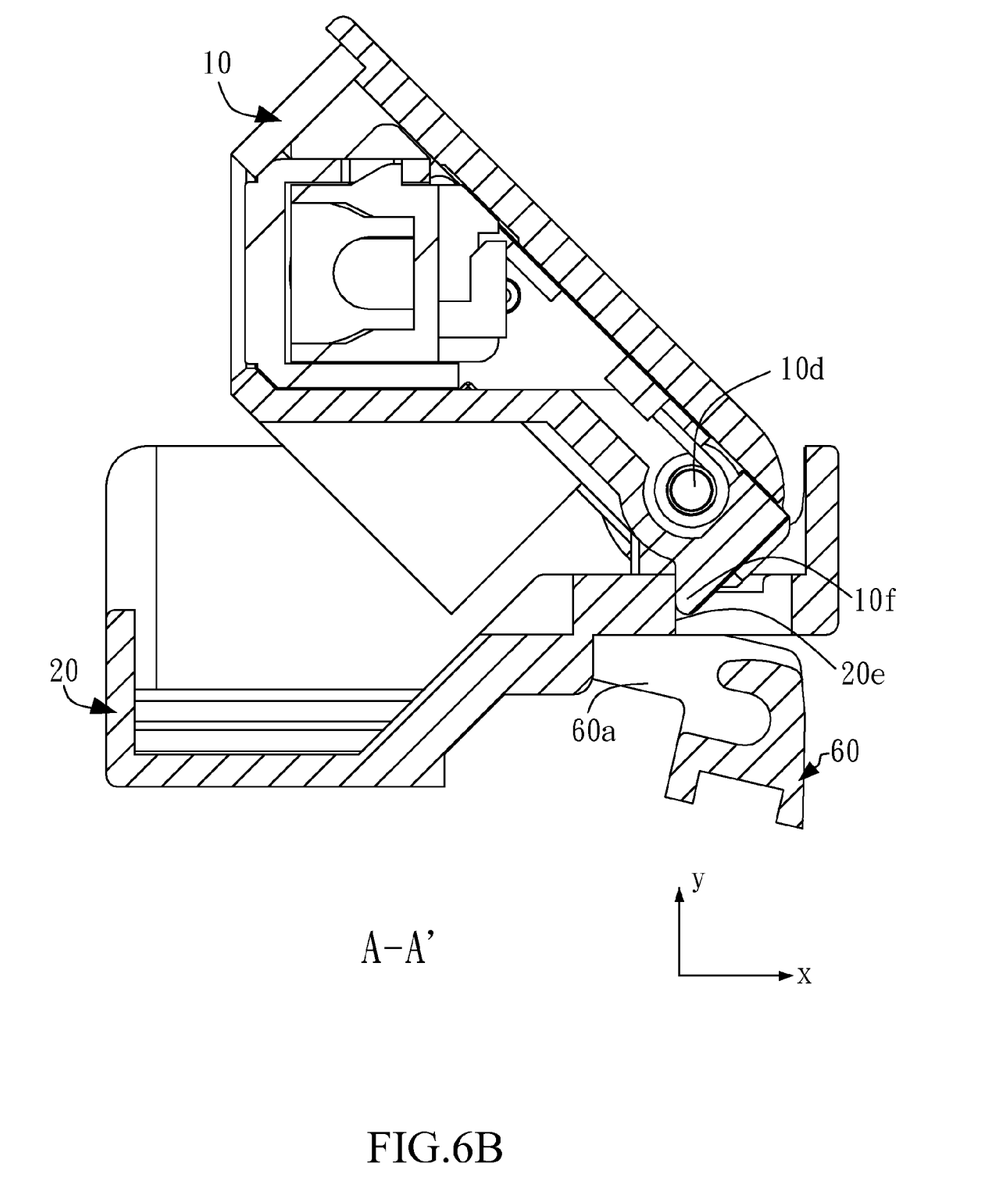

Notice that in this preferred embodiment, the second spring 70 clockwise rotates the flash to 45° and thus opens the flash 10. The second spring may rotate the flash 10 to other angles in other embodiments. FIG. 6A and FIG. 6B show a mechanism to control the rotating angle of the flash 10 according to the preferred embodiment, in which FIG. 6A is a front view of the flash module 1 and FIG. 6B is a cross-sectional view taken along line A-A' in FIG. 6A. The flash 10 further comprises a stop bump 10f, and the base 20 further comprises a sidewall 20e. When the flash 10 is clockwise rotated in the xy plane, the stop bump 10f is rotated as well until it reaches the sidewall 20e.

Figure 7:
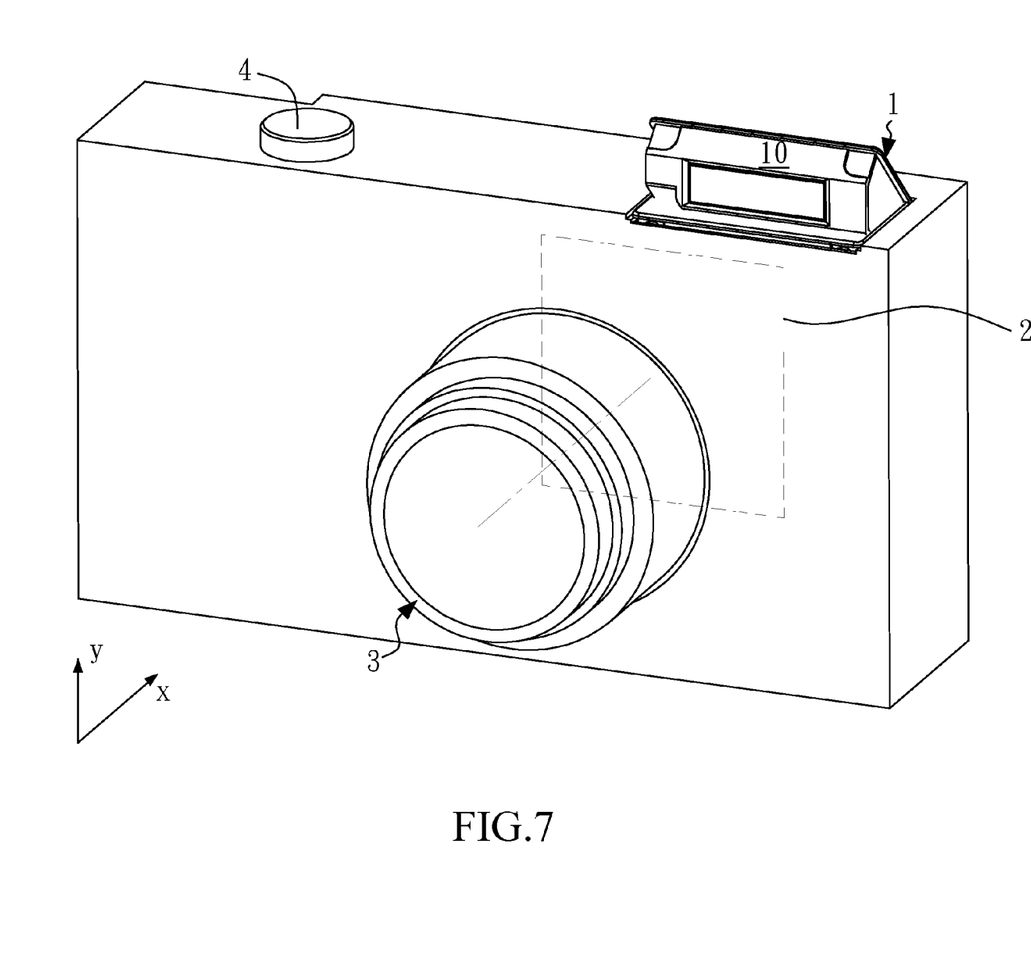
FIG. 7 shows an image-capturing apparatus having the above-mentioned flash module, according to another embodiment of this invention, in which the flash module is opened.

FIG. 7 shows an image-capturing apparatus having the above-mentioned flash module 1, according to another embodiment of this invention, in which the flash module 1 is opened. The image-capturing apparatus may be, for example but is not limited to, a digital camera or a video camera, and is a digital camera in this embodiment. Except flash module 1, the image camera further comprises an image sensor 2, a processor (not shown), a zoom lens 3, and a shutter button 4.

An exemplary operation of the image-capturing apparatus is described as follows. When the user wants to take a picture, he or she semi-presses the shutter button 4 to zoom an object that will be captured and detect the brightness of the environment by the image sensor 2. The detected brightness is transmitted to the processor, which determines whether open the flash module 1 according to the environment brightness. In detail, the criterion is to judge whether the environment brightness is greater than a predetermined value; if yes, the processor issues a flash order to instruct the elements of the flash module 1 performing the foregoing process to pop up the flash 10. After the flash 10 is popped up to the open position, the switch 80 feeds back a confirmed message to the processor, which issues a charge order after receiving the confirmed message. After the charge is finished, the user completely presses the shutter button 4 to actuate the flash 10 flashing, and the image sensor 2 captures the image of the object. After the image is captured, the user uses a hand to press downward the flash 10 to retract the flash 10 to the close position via the foregoing process. Notice that the above-mentioned image sensor 2 is a light-to-electrical conversion unit, which converts a light analog signal to an electric digital signal. The image sensor 2 comprises, for example but is not limited to, a charge-coupled device (CCD) or a Complementary Metal-Oxide-Semiconductor (CMOS).

The built-in type flash modules of embodiments of this invention employ a few elements to open and close the flash. In addition, all elements of the flash module are vertically arranged with respect to the image-capturing apparatus; this is beneficial to reduce the thickness and therefore minimize the size of the image-capturing apparatus.

Although specific embodiments have been illustrated and described, it will be appreciated by those skilled in the art that various modifications may be made without departing from the scope of the present invention, which is intended to be limited solely by the appended claims.

What is claimed is:

1. A flash module, comprising:
   a flash comprising a notch and a first hinge, the flash being rotated from an open position to a close position by the first hinge;
   a base comprising an accommodation space for placing the flash at the close position;
   a driver comprising an armature with an aperture, wherein the driver attracts the armature in a first position if the flash is at the close position;
   a linkage bar comprising a nick configured to fit the armature, and an upper end of the linkage bar contacts a lower end of the flash if the flash is at the close position;
   a hook comprising a crook, a shaft, and a second hinge, wherein the crook is arranged at one end of the hook and is inserted into the notch if the flash is at the close position, the shaft is arranged at another end of the hook and passes through the aperture, and the second hinge is used for rotating the hook;
   a first elastic member arranged between the base and the shaft; and
   a second elastic member arranged between the base and the flash.

2. The flash module as recited in claim 1, when the driver releases the armature, the first elastic member drives the armature moving to a second position by the shaft, and the shaft drives the hook rotating by the second hinge, such that the crook is detached from the notch, and then the second elastic member drives the flash rotating to the open position.

3. The flash module as recited in claim 1, when the flash is rotated by the first hinge and the lower end contacts with the upper end of the linkage bar, the linkage bar drives the armature moving to the first position via the nick, and the aperture of the armature drives the shaft and the hook rotating by the second hinge, such that the crook is inserted into the notch and the flash is retracted in the close position.

4. The flash module as recited in claim 1, wherein the flash module further comprises a switch with a lever, and the flash further comprises a control rod, the control rod drives the lever levering if the flash is rotated between the open position and the close position.

5. The flash module as recited in claim 1, wherein the flash further comprises a stop bump, the stop bump is rotated with the flash until it reaches a sidewall of the base.

6. A flash module, comprising:
   a flash for being rotated by a first hinge;
   a base for placing and connecting to the flash via the first hinge;
   a driver arranged on the base and comprising an armature with an aperture;
   a linkage bar for driving or being driven by the driver;
   a hook comprising:
      a first end for catching a retracted flash in the base;
      a second end for engaging with the base and the armature;
      a second hinge for rotating the hook; and
   two torsional members respectively arranged between the second end and the base and arranged between the base and the flash;

wherein when the driver releases the armature, the torsional member arranged between a shaft of the second end and the base moves the armature via the shaft, the shaft drives the hook rotating by the second hinge, and a crook of the first end is thus detached from a notch of the flash, so that the torsional member arranged between the base and the flash drives the flash rotating to an open position.

7. The flash module as recited in claim 6, further comprising a close position, when the flash is rotated to push a nick of the linkage bar and the armature, the armature binds to the driver and the aperture of the armature drives the shaft and the hook rotating by the second hinge, such that the crook is inserted into a notch of the flash and the flash is retracted in the close position.

8. The flash module as recited in claim 6, wherein the flash module further comprises a switch with a lever, and the flash further comprises a control rod, when the flash drives the control rod rotating, the control rod drives the lever levering, such that the position of the flash is detected.

9. The flash module as recited in claim 8, wherein the flash drives the control rod rotating between an open position and a close position.

10. The flash module as recited in claim 6, wherein the flash further comprises a stop bump, when the flash is rotated, the stop bump is rotated as well until it reaches a sidewall of the base.

11. An image-capturing apparatus, comprising:
   an image sensor for detecting a brightness;
   a processor for issuing a flash order according to the brightness; and
   a flash module, comprising:
      a flash comprising a notch and a first hinge, the first hinge rotating the flash between an open position and a close position;
      a base for placing the flash in an accommodation space at the close position;
      a solenoid comprising an armature with an aperture, when the flash is at the close position, the solenoid binds the armature;
      a linkage bar comprising a nick configured to fit the armature, when the flash is at the close position, an upper end of the linkage bar contacts a lower end of the flash;
      a hook comprising a first end, a second end, and a second hinge, wherein the first end for catching the flash when the flash is at the close position, the second end passes through the aperture, and the second hinge is used for rotating the hook;
      a first elastic member arranged between the base and a shaft; and
      a second elastic member arranged between the base and the flash.

12. The image-capturing apparatus as recited in claim 11, when the processor performing a zooming process, the processor determines whether open the flash module according to the brightness, if the flash module is determined to open, the flash is rotated to the open position.

13. The image-capturing apparatus as recited in claim 11, when the solenoid frees the armature, the first elastic member drives the armature moving via the shaft, and the shaft drives the hook rotating by the second hinge, such that a crook is detached from the notch, and the flash is rotated to the open position via the first hinge.

14. The image-capturing apparatus as recited in claim 13, when a force against to the second elastic member is exerted to the flash, the lower end of the flash contacts the linkage bar, the linkage bar then pushes the armature moving to bind the solenoid via the nick, and the aperture of the armature pushes the shaft and the hook rotating by the second hinge, such that the crook is inserted into the notch and the flash is retracted at the close position.

15. The image-capturing apparatus as recited in claim 11, wherein the flash module further comprises a switch that comprises a lever, and the flash further comprises a control rod, when the flash drives the control rod rotating, the control rod drives the lever levering, such that the switch feeds back a confirmed message to the processor.

16. The image-capturing apparatus as recited in claim 15, wherein the flash drives the control rod rotating between the open position and the close position, and the processor detects a position of the flash via the confirmed message.

17. The image-capturing apparatus as recited in claim 11, wherein the image sensor comprises a light-to-electrical conversion unit.

18. The image-capturing apparatus as recited in claim 11, wherein the flash further comprises a stop bump is rotated with the flash until the stop bump reaches a sidewall of the base.

* * * * *